UNITED STATES PATENT OFFICE 2,247,741

WASHING, WETTING, AND EMULSIFYING AGENT

Hans Beller and Egi V. Fasce, Baton Rouge, La., assignors to Jasco Incorporated, a corporation of Louisiana No Drawing. Application December 22, 1936, Serial No. 117,153

5 Claims. (Cl. 252—353)

The present invention relates to washing, wetting and emulsifying agents.

It is one object of our invention to provide products for this art which have superior sudsing properties. Another aim is to impart such improved sudsing properties to compositions which by themselves possess all the qualifications of a commercial wetting and emulsifying agent required in the manufacture of soap-like products as, for example, those similar to Turkey-red oil, for use in the textile industry as well as for household purposes. Another object are preparations which will display the combined qualities of a useful washing, wetting and emulsifying agent, and in addition, will give an increased sudsing or foaming effect when applied to textile materials under the usual conditions, particularly to soiled fabrics of all kinds, thus insuring a quick and complete removal with the suds, of any foreign substances which adhere to the fibers or tissues, and finally leaving behind a most thoroughly cleansed piece of goods. Other objects will appear from the subsequent description.

Recent developments in this art have made available a number of greatly improved washing, wetting and emulsifying agents which are advantageously distinguished from ordinary soaps and other wetting agents, such as Turkey-red oil, by their pronounced and more efficacious action as wetting agents and emulsifiers, whenever used in the most various baths, heretofore prevailing for the processing of textiles, such as washing or dyeing. It was ascertained that such process is largely due to the greater indifference of the new agents to the repressing influence upon their characteristic mode of action, by their co-actors in the washing or dyeing baths, which always to a greater or lesser extent tend to check the action of those previously used ordinary soaps or wetting agents.

Yet, practical experiences which are now quite familiar to the experts in this art have soon revealed the fact that no one agent, known so far, will satisfactorily respond to all the above mentioned requirements of a useful washing, wetting and emulsifying agent under all circumstances. Where one agent might be a good emulsifier, it will not live up to expectations as a foaming agent, or vice versa. There has therefore arisen a rapidly increasing demand for an agent which will combine in itself all of the aforementioned properties to a degree sufficient to be in accordance with practical operating conditions in industrial or household work.

We have now found compositions of matter which present a solution of the aforementioned problem, as will be shown further below. Chiefly these new compositions comprise a true sulfonic acid substance which contains at least 8 carbon atoms and corresponds to the formula

wherein R denotes an aliphatic radical, $XR_1$ denotes an oxyalkylene group (—O—R—), or an amino-alkylene group, and Me denotes the radical of an alkali metal, and an alcohol sulfate prepared from oxidation products of liquid or solid non-aromatic hydrocarbons.

Both types of textile assistants have ever since their discovery been recognized as valuable agents in washing and cleansing. More recently the attention of the art has been particularly directed to the alcohol sulfates prepared from oxidation products of liquid or solid non-aromatic hydrocarbons. Their properties as textile assistants were found to be particularly useful. U. S. P. 1,908,376, for instance, illustrates this fact. These alcohol sulfates may be prepared by sulfonation of the alcohols disclosed in U. S. Patents 1,921,381 and 2,048,662 with chlorosulfonic acid or fuming sulfuric acid.

In applying the various properties of the aforementioned alcohol sulfates to practical requirements, we have ascertained that their sudsing and foaming power is considerably enhanced by admixture with them, of substantial quantities of a true sulfonic acid substance having the aforementioned constitution.

The true sulfonic acid substance may be prepared in known manner by condensation of an aliphatic carboxylic acid with a compound of the general formula: X.R.Y, wherein R means an aliphatic hydrocarbon radical which may contain oxygen or a nitrogen-containing group, for instance, $NR_1$, as a member of the chain, or an aromatic hydrocarbon radical, X represents OH or $HNR_1$, $R_1$ being hydrogen or an alkyl-, aralkyl- or aryl radical, and wherein Y means $SO_2OH$. True sulfonic acids which will serve the purposes of the present invention are, among others, compounds obtainable by reaction between chlorides of palmnut oil fatty acids, coconut fatty acids and oleic acid, and other fatty acids of similar composition, with methyl taurine, taurine or hydroxyethane sulfonic acid.

The following examples may illustrate the invention. Since our discovery reveals its most striking qualities in contrast to the teachings of the prior art to which we have referred, a demonstration of the superior sudsing or foaming power of our mixtures, in comparison with that of the single components, has been added to our tests. The certainty of the comparative values which are offered is insured by the employment of standard type sudsing apparatus which embody the principle of determining the sudsing power by measuring the volume of suds developed from soap solutions, following mechanical agitation.

*Example 1*

Comparative sudsing tests were carried out in a plunger-type sudsing apparatus employing 200 cc. of 360 p. p. m. water. The apparatus consisted briefly of a glass cylinder 10″ x 3¾″ I. D. which was graduated in 20 cc. divisions and was immersed in a water bath at 128–133° F. To the above volume of hard water, after allowing to stand for 15 minutes, was added increasing amounts of solutions containing: (A) 5 gm. per 100 cc. distilled water (concentration based on dry organic soap basis) of the alcohol sulfate soap prepared from hydrocarbon oxidation products. The alcohol sulfonates were obtained by sulfonation of alcohols resulting from the oxidation of crude scale wax with air at 160° C. and with application of a manganese catalyst and hydrogenation of the oxidation (carbonyl-) compounds in the presence of nickel. And (B) 4.5 gm./100 cc. concentration of the same soap as in "(A)"+10% or 0.5 gm./100 cc. of a product of the formula $$C_8H_{17}CH:CH(CH_2)_7CO-OCH_2-CH_2-SO_3Na$$

With each addition of the soap solution from a burette, the solution in the cylinder was agitated for ten minutes by vertical motion of a plunger which was constructed of ¼″ wire gauze and extended to a point just above the bottom of the cylinder which permitted a stroke length of 8″.

The volume of suds was observed immediately after agitation had been stopped. Comparison of the sudsing data below indicates that the addition of 10% of Igepon A. P. definitely enhances the original sudsing properties of the alcohol sulfates prepared from hydrocarbon oxidation products. The following table illustrates this point:

| Conc. of dry organic soap G. P. L. | Net volume of suds, cc. | |
|---|---|---|
| | (A) Na-alcohol-sulfate | (B) Na-alcohol-sulfate+10%  $C_8H_{17}CH:CH(CH_2)_7CO-OCH_2-CH_2-SO_3Na$ |
| 0.18 | 10 | 10 |
| 0.36 | 10 | 40 |
| 0.89 | 90 | 140 |
| 1.33 | 180 | 265 |
| 1.75 | 245 | 315 |

*Example 2*

In these tests, the so-called "Launderometer" was used for examination of the foaming powers of various washing agents in the presence of soiled material. Substantially the apparatus consists of a shaft which rotates in a water-bath, and to which are affixed graduated test tubes made of glass and provided with covers. The temperature of the water-bath is kept constant with a thermoregulator. Prior to each experiment, the test jars are pre-heated for a short time in an oven in order to adjust them to the temperature of the test.

Two pieces of soiled wool fabric (5″:5″) are brought into graduated test jars, and 200 cc. of the soap solution to be examined and ten steel balls (0.25″ diameter) are added. Thereupon the test jars are closed and fastened to the shaft and rotated in the water-bath for a period of 20 minutes at 100° F. The steel balls in the jars effect an even mechanical mixture and working of the goods with the soap solution. Thereupon, without removing the test jars from the water-bath, the volume of foam in each jar is determined by a reading of the graduation.

Our comparative tests were made with solutions of (1) a reaction product from palmnut oil fatty acid chloride and methyl tauride, (2) sodium salt of the acid sulfuric acid esters of alcohols separated from the unsaponifiable parts of an oxidation product of "sweater oil," i. e. oil prepared from slack wax by sweating ("The Science of Petroleum," Oxford University Press, New York, (1938), col. 3, page 1955), (3) mixtures of 50, 40 and 30 parts of a reaction product from palmnut oil fatty acid chloride and methyl tauride with 50, 60 and 70 parts of the sodium salt named under (2) above.

The results obtained after 20 minutes of washing of solid wool at 100° F. in water of 360 p. p. m. degree of hardness were as follows:

| Gr. washing agent used in 1 liter washing solution | | Amount of foam developed, in ccm. |
|---|---|---|
| Reaction product (1) above | Na-alcohol-sulfate | |
| 0.5 | 0 | 175–200 |
| 0 | 0.5 | 0 |
| 0.5 | 0.5 | 280 |
| 0.4 | 0.6 | 250 |
| 0.3 | 0.7 | 175–200 |

The figures shown above make it obvious that the foaming power of mixtures of a reaction product from palmnut oil fatty acid chloride and methyl tauride and an alcohol sulfate manufactured from alcohols which were separated from an oxidation product of "sweater oil", is substantially above the sum of the foaming powers of the single components of which the mixture is constituted.

We claim:

1. A composition of matter having improved sudsing properties comprising an alcohol sulfate prepared from oxidation products of liquid or solid non-aromatic hydrocarbons, and a true sulfonic acid substance responding to the general formula R—CO—X—R₁—SO₂OMe wherein R denotes an aliphatic radical, XR₁ denotes an oxy alkylene group (—O—R—) or an amino alkylene group, and Me denotes the radical of an alkali metal, the true sulfonic acid being present in an amount of at least 10% by weight of the alcohol sulfate.

2. A composition of matter having improved sudsing properties comprising an alcohol sulfate prepared from an oxidation product of paraffin hydrocarbons, and a true sulfonic acid substance responding to the general formula

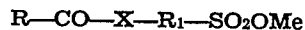
R—CO—X—R₁—SO₂OMe wherein R denotes an aliphatic radical, XR₁ denotes an oxy alkylene group (—O—R—) or an amino alkylene group, and Me denotes the radical of an alkali metal, the true sulfonic acid being present in an amount of at least 10% by weight of the alcohol sulfate.

3. A composition of matter having improved sudsing properties comprising an alcohol sulfate prepared from an oxidation product of crude scale wax, and a product of the formula $$C_8H_{17}CH:CH(CH_2)_7CO\text{—}OCH_2\text{—}CH_2\text{—}SO_3Na$$

said product being present in an amount of at least 10% by weight of the alcohol sulfate.

4. A composition of matter having improved sudsing properties comprising an alcohol sulfate prepared from an oxidation product of "sweater oil" and a reaction product from palmnut oil fatty acid chloride and methyl tauride, the true sulfonic acid being present in an amount of at least 10% by weight of the alcohol sulfate.

5. A wetting, sudsing and detergent agent comprising a mixture of a water-soluble alkyl sulfate having 8 to 18 carbon atoms in the alkyl radical and a water-soluble salt of a true sulfonic acid corresponding to the general formula $$R\text{—}CO\text{—}X\text{—}R_1\text{—}SO_2\text{—}OH$$

in which R denotes an aliphatic radical having 8 to 18 carbon atoms, and —X—$R_1$— denotes an oxyalkylene or an amino alkylene radical, the ratio of true sulfonate to alkyl sulfate being not greater than three to two.

HANS BELLER.
EGI V. FASCE.